(12) United States Patent
Watson

(10) Patent No.: US 7,501,079 B2
(45) Date of Patent: Mar. 10, 2009

(54) IRREVERSIBLE TEMPERATURE INDICATING PAINT

(75) Inventor: Hugh M. L. Watson, Derby (GB)

(73) Assignee: Rolls-Royce plc, London (GB)

( * ) Notice: Subject to any disclaimer, the term of this patent is extended or adjusted under 35 U.S.C. 154(b) by 270 days.

(21) Appl. No.: 11/144,603

(22) Filed: Jun. 6, 2005

(65) Prior Publication Data

US 2006/0079618 A1    Apr. 13, 2006

(30) Foreign Application Priority Data

Jul. 8, 2004    (GB) .................................. 0415297.1

(51) Int. Cl.
 *G01N 33/00* (2006.01)
 *G01D 21/00* (2006.01)
(52) U.S. Cl. .................................... 252/408.1; 116/207
(58) Field of Classification Search ............. 252/408.1; 524/407, 494; 116/207
 See application file for complete search history.

(56) References Cited

U.S. PATENT DOCUMENTS

| 4,925,727 | A * | 5/1990 | Brown et al. ................. 428/199 |
| 6,764,771 | B1 * | 7/2004 | Heimberg et al. ............ 428/472 |
| 2003/0049847 | A1 * | 3/2003 | Watson et al. ................... 436/2 |

FOREIGN PATENT DOCUMENTS

| EP | 1 288 266 A1 | 3/2003 |
| EP | 1 288 267 A1 | 3/2003 |
| EP | 1 291 393 A1 | 3/2003 |
| EP | 1 291 394 A1 | 3/2003 |
| EP | 1 291 395 A1 | 3/2003 |
| JP | A 2001-302972 | 10/2001 |
| WO | WO 03/048646 A2 | 6/2003 |

* cited by examiner

*Primary Examiner*—Elizabeth L McKane
*Assistant Examiner*—Kevin C Joyner
(74) *Attorney, Agent, or Firm*—Oliff & Berridge, PLC

(57) ABSTRACT

An irreversible temperature indicating paint comprises 0.7 wt % to 0.9 wt % toluidine red, 7 wt % to 32 wt % cobalt aluminium spinel and glass, 7 wt % to 32 wt % cobalt chromite spinel, alumina, purple gold and frit, 37 wt % to 41 wt % acrylic resin, 20 wt % to 23 wt % silicone resin excluding solvent. The solvent comprises a mixture of 80% 1-methoxy-2-propanol and 20% dipropylene glycol monomethyl ether. A particular irreversible temperature indicating paint comprises 0.78 wt % toluidine red, 19.55 wt % cobalt aluminium spinel and glass, 19.55 wt % cobalt chromite spinel, alumina, purple gold and frit, 39.1 wt % acrylic resin, 21.1 wt % silicone resin excluding solvent. The irreversible temperature indicating paint is used to determine the temperatures to which various parts of turbine blades, turbine vanes or other components are subjected in operation of a gas turbine engine.

11 Claims, No Drawings

IRREVERSIBLE TEMPERATURE INDICATING PAINT

The present invention relates to an irreversible temperature indicating paint.

Irreversible temperature indicating paint changes colour at one or more known temperatures. Theses colour changes of the temperature indicating paint indicate the temperature to which different parts of a component, or components, have been subjected. The final colour of the irreversible temperature indicating paint is dependent on both the temperature it is subjected to and the time period over which it is held at a raised temperature. The irreversible temperature indicating paint is applied to a component in a test situation and subsequently analysed to determine the temperatures to which different regions of the component reached during the test. Irreversible temperature indicating paints thus produce a temperature profile over the whole surface of the component rather than discrete points, if for example thermocouples are used.

Irreversible temperature indicating paints are applied to components, for example turbine blades, turbine vanes and combustors, of gas turbine engines and the gas turbine engine is run at the gas turbine engines normal operating conditions.

One known irreversible temperature indicating paint described in our UK patent GB1103059 comprises principally lead chromate, magnesium carbonate and silica.

Another known irreversible temperature indicating paint described in our UK patent GB2204874 comprises one or more of silver, gold, platinum, palladium, copper, nickel, chromium, titanium and silicone dispersed in 10 to 70 wt % solvent and resin.

Further known irreversible temperature indicating paints are described in our European patent applications EP1288266A1, EP1288267A1, EP1291393A1, EP1291394A1 and EP1291395A1.

The irreversible temperature indicating paint described in EP1288266A1 comprises cobalt ammonium phosphate, sodium alumino sulpho silicate, silica, alumina, toluidine red, a binder and a solvent.

The irreversible temperature indicating paint described in EP1288267A1 comprises cobalt silicate, alumino silicate, toluidine red, a binder and a solvent.

The irreversible temperature indicating paint described in EP1291393A1 comprises cobalt chromite spinel, alumina, gold purple, a frit, a binder and a solvent.

The irreversible temperature indicating paint described in EP1291394A1 comprises cobalt zinc silicone blue phenacite, a frit, a binder and a solvent.

The irreversible temperature indicating paint described in EP1291395A1 comprises cobalt aluminium spinel, glass, a binder and a solvent.

All of the irreversible temperature indicating paints mentioned above require a person interpreting them to have a degree of experience in irreversible temperature indicating paints to enable a successful interpretation of the temperatures to which different regions of the component reached during the test. Interpretation of the colour changes, known as change points, of the irreversible temperature indicating paints is a very subjective process which requires significant training and experience of the person interpreting the irreversible temperature indicating paints.

In addition with the above mentioned irreversible temperature indicating paints it is difficult to identify colour changes, or change points, in the region of 810° C.

Accordingly the present invention seeks to provide a novel irreversible temperature indicating paint, which at least reduces, or overcomes, the above-mentioned problems.

Accordingly the present invention provides an irreversible temperature indicating paint comprising toluidine red, cobalt aluminium spinel and glass, cobalt chromite spinel, alumina, purple gold, a frit, a binder and a solvent.

Preferably the binder comprises acrylic resin and silicone resin.

Preferably the irreversible temperature indicating paint comprises 0.7 wt % to 0.9 wt % toluidine red, 7 wt % to 32 wt % cobalt aluminium spinel and glass, 7 wt % to 32 wt % cobalt chromite spinel, alumina, purple gold and frit, 37 wt % to 41 wt % acrylic resin, 20 wt % to 23 wt % silicone resin excluding solvent.

Preferably the irreversible temperature indicating paint comprises 0.7 wt % to 0.9 wt % toluidine red, 7.5 wt % to 31.5 wt % cobalt aluminium spinel and glass, 7.5 wt % to 31.5 wt % cobalt chromite spinel, alumina, purple gold and frit, 37 wt % to 41 wt % acrylic resin, 20 wt % to 23 wt % silicone resin excluding solvent.

Preferably the irreversible temperature indicating paint comprises 0.78 wt % toluidine red, 19.55 wt % cobalt aluminium spinel and glass, 19.55 wt % cobalt chromite spinel, alumina, purple gold and frit, 39.1 wt % acrylic resin, 21.1 wt % silicone resin excluding solvent.

The irreversible temperature indicating paint may comprise 0.78 wt % toluidine red, 7.8 wt % cobalt aluminium spinel and glass, 31.3 wt % cobalt chromite spinel, alumina, purple gold and frit, 39.1 wt % acrylic resin, 21.1 wt % silicone resin excluding solvent.

The irreversible temperature indicating paint may comprise 0.78 wt % toluidine red, 31.3 wt % cobalt aluminium spinel and glass, 7.8 wt % cobalt chromite spinel, alumina, purple gold and frit, 39.1 wt % acrylic resin, 21.1 wt % silicone resin excluding solvent.

The irreversible temperature indicating paint may comprise 0.78 wt % toluidine red, 11.7 wt % cobalt aluminium spinel and glass, 27.4 wt % cobalt chromite spinel, alumina, purple gold and frit, 39.1 wt % acrylic resin, 21.1 wt % silicone resin excluding solvent.

The irreversible temperature indicating paint may comprise 0.78 wt % toluidine red, 27.4 wt % cobalt aluminium spinel and glass, 11.7 wt % cobalt chromite spinel, alumina, purple gold and frit, 39.1 wt % acrylic resin, 21.1 wt % silicone resin excluding solvent.

The irreversible temperature indicating paint may comprise 0.78 wt % toluidine red, 15.6 wt % cobalt aluminium spinel and glass, 23.5 wt % cobalt chromite spinel, alumina, purple gold and frit, 39.1 wt % acrylic resin, 21.1 wt % silicone resin excluding solvent.

The irreversible temperature indicating paint may comprise 0.78 wt % toluidine red, 23.5 wt % cobalt aluminium spinel and glass, 15.6 wt % cobalt chromite spinel, alumina, purple gold and frit, 39.1 wt % acrylic resin, 21.1 wt % silicone resin excluding solvent.

Preferably the solvent comprises a mixture of propylene glycol ethers.

Preferably the solvent comprises a mixture of 80% 1-methoxy-2-propanol and 20% dipropylene glycol monomethyl ether.

The present invention will be more fully described by way of example.

An irreversible temperature indicating paint according to the present invention comprises toluidine red, cobalt aluminium spinel and glass, cobalt chromite spinel, alumina, purple gold, a frit, a binder and a solvent.

The irreversible temperature indicating paint broadly comprises 0.7 wt % to 0.9 wt % toluidine red, 7 wt % to 32 wt % cobalt aluminium spinel and glass, 7 wt % to 32 wt % cobalt chromite spinel, alumina, purple gold and frit, 37 wt % to 41 wt % acrylic resin, 20 wt % to 23 wt % silicone resin excluding solvent. The solvent comprises a mixture of propylene glycol ethers, for example the solvent comprises a mixture of 80% 1-methoxy-2-propanol and 20% dipropylene glycol monomethyl ether. The amount of solvent used is varied depending upon the particular method of applying the irreversible temperature indicating paint.

EXAMPLE 1

A particular irreversible temperature indicating paint comprises 0.78 wt % toluidine red, 19.55 wt % cobalt aluminium spinel and glass, 19.55 wt % cobalt chromite spinel ($CoCr_2O_3$), alumina ($Al_2O_3$), purple gold and frit, 39.1 wt % acrylic resin, 21.1 wt % silicone resin excluding solvent. If this particular irreversible temperature indicating paint is applied by spraying it is produced by mixing the constituents in the following weights, or proportionally thereto, 0.2 g toluidine red,
5 g cobalt aluminium spinel and glass,
5 g cobalt chromite spinel, alumina, purple gold and frit,
10 g acrylic resin,
5.4 g silicone resin
12 g solvent.

The irreversible temperature indicating paint may be made in a micronising mill for small quantities or may be made in a ball mill or other suitable mill for larger quantities. The irreversible temperature indicating paint is sprayed onto a component, is allowed to dry for 1 hour and is then stoved in an oven for 1 hour at 300° C. The component may then be run in a gas turbine engine at its normal operating conditions.

Cobalt aluminium spinel and glass is sold under the trade name 121603 Decorating Colour by Degussa Metals Catalysts Cerdec AG of Geschaftsbereich Cerdec, P.O. Box 110403, D-60039, Frankfurt, Germany. The cobalt aluminium spinel may comprise two or more cobalt aluminium spinels comprising cobalt and aluminium which have a blue colour or blue green colour. Cobalt aluminium spinel comprises cobalt aluminate or cobalt aluminium oxide.

Decorating Colour Blue 121603 comprises glass and oxides having a CAS-No65997-17-3, a cobalt aluminium spinel having a CAS-No1345-16-0 and a cobalt aluminium spinel having a CAS-No68187-11-1.

Cobalt chromite spinel, alumina, gold purple and frit is sold under the trade name CO1E/9831 Decorating Colour Purple by Degussa Metals Catalysts Cerdec AG of Geschaftsbereich Cerdec, P.O. Box 110403, D-60039, Frankfurt, Germany. The cobalt chromium spinel has a green colour.

Decorating Colour Purple CO1E/9831 comprises a frit having a CAS-No65997-18-4, a cobalt chromite spinel having a CAS-No68187-49-5, alumina having a CAS-No1344-28-1 and gold purple having a CAS-No1345-24-0.

The irreversible temperature indicating paint produces a very glossy glaze at around 810° C., after 3 minutes exposure. The irreversible temperature indicating paint is easily interpreted by drawing a white marking pencil, Berol Verithin, across the irreversible temperature indicating paint until no mark can be made on the irreversible temperature indicating paint. The point at which no mark can be made, the point at which the glaze has been formed, has the advantage of being able to be identified as a temperature boundary, as a colour change or change point, by an unskilled person. It is to be noted that the temperature at which the glaze is formed reduces with the length of exposure to the raised temperature.

The proportions of the paint may be altered to give different temperatures at which the glaze is formed.

EXAMPLE 2

Another irreversible temperature indicating paint comprises 0.78 wt % toluidine red, 7.8 wt % cobalt aluminium spinel and glass, 31.3 wt % cobalt chromite spinel ($CoCr_2O_3$), alumina ($Al_2O_3$), purple gold and frit, 39.1 wt % acrylic resin, 21.1 wt % silicone resin excluding solvent. If this particular irreversible temperature indicating paint is applied by spraying it is produced by mixing the constituents in the following weights, or proportionally thereto, 0.2 g toluidine red,
2 g cobalt aluminium spinel and glass,
8 g cobalt chromite spinel, alumina, purple gold and frit,
10 g acrylic resin,
5.4 g silicone resin
12 g solvent.

EXAMPLE 3

Another irreversible temperature indicating paint comprises 0.78 wt % toluidine red, 31.3 wt % cobalt aluminium spinel and glass, 7.8 wt % cobalt chromite spinel ($CoCr_2O_3$), alumina ($Al_2O_3$), purple gold and frit, 39.1 wt % acrylic resin, 21.1 wt % silicone resin excluding solvent. If this particular irreversible temperature indicating paint is applied by spraying it is produced by mixing the constituents in the following weights, or proportionally thereto, 0.2 g toluidine red,
8 g cobalt aluminium spinel and glass,
2 g cobalt chromite spinel, alumina, purple gold and frit,
10 g acrylic resin,
5.4 g silicone resin
12 g solvent.

EXAMPLE 4

A further irreversible temperature indicating paint comprises 0.78 wt % toluidine red, 11.7 wt % cobalt aluminium spinel and glass, 27.4 wt % cobalt chromite spinel ($CoCr_2O_3$), alumina ($Al_2O_3$), purple gold and frit, 39.1 wt % acrylic resin, 21.1 wt % silicone resin excluding solvent. If this particular irreversible temperature indicating paint is applied by spraying it is produced by mixing the constituents in the following weights, or proportionally thereto, 0.2 g toluidine red,
3 g cobalt aluminium spinel and glass,
7 g cobalt chromite spinel, alumina, purple gold and frit,
10 g acrylic resin,
5.4 g silicone resin
12 g solvent.

EXAMPLE 5

A further irreversible temperature indicating paint comprises 0.78 wt % toluidine red, 27.4 wt % cobalt aluminium spinel and glass, 11.7 wt % cobalt chromite spinel ($CoCr_2O_3$), alumina ($Al_2O_3$), purple gold and frit, 39.1 wt % acrylic resin, 21.1 wt % silicone resin excluding solvent. If this particular irreversible temperature indicating paint is applied by spraying it is produced by mixing the constituents in the following weights, or proportionally thereto, 0.2 g toluidine red, 7 g cobalt aluminium spinel and glass,
3 g cobalt chromite spinel, alumina, purple gold and frit,
10 g acrylic resin,
5.4 g silicone resin
12 g solvent.

EXAMPLE 6

Another irreversible temperature indicating paint comprises 0.78 wt % toluidine red, 15.6 wt % cobalt aluminium spinel and glass, 23.5 wt % cobalt chromite spinel ($CoCr_2O_3$), alumina ($Al_2O_3$), purple gold and frit, 39.1 wt % acrylic resin, 21.1 wt % silicone resin excluding solvent. If this particular irreversible temperature indicating paint is applied by spraying it is produced by mixing the constituents in the following weights, or proportionally thereto,
0.2 g toluidine red,
4 g cobalt aluminium spinel and glass,
6 g cobalt chromite spinel, alumina, purple gold and frit,
10 g acrylic resin,
5.4 g silicone resin
12 g solvent.

EXAMPLE 7

A particular irreversible temperature indicating paint comprises 0.78 wt % toluidine red, 23.5 wt % cobalt aluminium spinel and glass, 15.6 wt % cobalt chromite spinel ($CoCr_2O_3$), alumina ($Al_2O_3$), purple gold and frit, 39.1 wt % acrylic resin, 21.1 wt % silicone resin excluding solvent. If this particular irreversible temperature indicating paint is applied by spraying it is produced by mixing the constituents in the following weights, or proportionally thereto,
0.2 g toluidine red,
6 g cobalt aluminium spinel and glass,
4 g cobalt chromite spinel, alumina, purple gold and frit,
10 g acrylic resin,
5.4 g silicone resin
12 g solvent.

The irreversible temperature indicating paint is applied to turbine blades, turbine vanes, combustors or other components of gas turbine engines. The irreversible temperature indicating paint is used to determine the temperature to which various parts of the turbine blade, turbine vane, combustor or other component are subjected to in operation of the gas turbine engine.

The irreversible temperature indicating paint may be used on components in other engines or other machines or other apparatus to determine the temperature to which various parts of the component are subjected in operation.

I claim:

1. An irreversible temperature indicating paint comprising 0.7 wt % to 0.9 wt % toluidine red, 7 wt % to 32 wt % cobalt aluminium spinel and glass, 7 wt % to 32 wt % cobalt chromite spinel, alumina, purple gold and frit, 37 wt % to 41 wt % acrylic resin, 20 wt % to 23 wt % silicone resin by weight excluding solvent, and a solvent;
wherein the paint forms a glossy glaze at around 810°C.

2. An irreversible temperature indicating paint as claimed in claim 1 comprising 0.7 wt % to 0.9 wt % toluidine red, 7.5 wt % to 31.5 wt % cobalt aluminium spinel and glass, 7.5 wt % to 31.5 wt % cobalt chromite spinel, alumina, purple gold and frit, 37 wt % to 41 wt % acrylic resin, 20 wt % to 23 wt % silicone resin excluding solvent.

3. An irreversible temperature indicating paint as claimed in claim 2 comprising 0.78 wt % toluidine red, 19.55 wt % cobalt aluminium spinel and glass, 19.55 wt % cobalt chromite spinel ($CoCr_2O_3$), alumina ($Al_2O_3$), purple gold and frit, 39.1 wt % acrylic resin, 21.1 wt % silicone resin excluding solvent.

4. An irreversible temperature indicating paint as claimed in claim 2 comprising 0.78 wt % toluidine red, 7.8 wt % cobalt aluminium spinel and glass, 31.3 wt % cobalt chromite spinel, alumina, purple gold and frit, 39.1 wt % acrylic resin, 21.1 wt % silicone resin excluding solvent.

5. An irreversible temperature indicating paint as claimed in claim 2 comprising 0.78 wt % toluidine red, 31.3 wt % cobalt aluminium spinel and glass, 7.5 wt % cobalt chromite spinel, alumina, purple gold and frit, 39.1 wt % acrylic resin, 21.1 wt % silicone resin excluding solvent.

6. An irreversible temperature indicating paint as claimed in claim 2 comprising 0.78 wt % toluidine red, 11.7 wt % cobalt aluminium spinel and glass, 27.4 wt % cobalt chromite spinel, alumina, purple gold and frit, 39.1 wt % acrylic resin, 21.1 wt % silicone resin excluding solvent.

7. An irreversible temperature indicating paint as claimed in claim 2 comprising 0.78 wt % toluidine red, 27.4 wt % cobalt aluminium spinel and glass, 11.7 wt % cobalt chromite spinel, alumina, purple gold and frit, 39.1 wt % acrylic resin, 21.1 wt % silicone resin excluding solvent.

8. An irreversible temperature indicating paint as claimed in claim 2 comprising 0.78 wt % toluidine red, 15.6 wt % cobalt aluminium spinel and glass, 23.5 wt % cobalt chromite spinel, alumina, purple gold and frit, 39.1 wt % acrylic resin, 21.1 wt % silicone resin excluding solvent.

9. An irreversible temperature indicating paint as claimed in claim 2 comprising 0.78 wt % toluidine red, 23.5 wt % cobalt aluminium spinel and glass, 15.6 wt % cobalt chromite spinel, alumina, purple gold and frit, 39.1 wt % acrylic resin, 21.1 wt % silicone resin excluding solvent.

10. An irreversible temperature indicating paint as claimed in claim 1 wherein the solvent comprises a mixture of propylene glycol ethers.

11. An irreversible temperature indicating paint as claimed in claim 10 wherein the solvent comprises a mixture of 80% 1-methoxy-2-propanol and 20% dipropylene glycol monomethyl ether.

* * * * *